US008751354B2

(12) United States Patent
Bohman

(10) Patent No.: US 8,751,354 B2
(45) Date of Patent: Jun. 10, 2014

(54) METHODS AND SYSTEMS FOR COMPARING STOCKS

(76) Inventor: Leif G. Bohman, Torekov (SE)

( * ) Notice: Subject to any disclaimer, the term of this patent is extended or adjusted under 35 U.S.C. 154(b) by 0 days.

(21) Appl. No.: 12/980,688

(22) Filed: Dec. 29, 2010

(65) Prior Publication Data

US 2011/0184885 A1    Jul. 28, 2011

Related U.S. Application Data

(60) Provisional application No. 61/290,997, filed on Dec. 30, 2009.

(51) Int. Cl.
*G06Q 40/00* (2012.01)
*G06Q 40/06* (2012.01)
*G06Q 40/04* (2012.01)

(52) U.S. Cl.
CPC ............... *G06Q 40/00* (2013.01); *G06Q 40/06* (2013.01); *G06Q 40/04* (2013.01)
USPC ................ 705/36 R; 705/35; 705/37

(58) Field of Classification Search
CPC ........ G06Q 40/00; G06Q 40/06; G06Q 40/04
USPC ..................... 705/36, 35, 36 R, 37
See application file for complete search history.

(56) References Cited

U.S. PATENT DOCUMENTS

| 3,933,305 | A | * | 1/1976 | Murphy | 235/70 A |
| 6,907,404 | B1 | * | 6/2005 | Li | 705/36 R |
| 7,181,423 | B2 | * | 2/2007 | Blanchard et al. | 705/36 R |
| 7,337,135 | B1 | * | 2/2008 | Findlay et al. | 705/36 R |
| 7,555,452 | B2 | * | 6/2009 | Van Lier | 705/36 R |
| 7,693,770 | B2 | * | 4/2010 | Seaman et al. | 705/36 R |
| 2004/0177016 | A1 | * | 9/2004 | Jones et al. | 705/35 |
| 2005/0228747 | A1 | * | 10/2005 | Gumport | 705/37 |
| 2008/0154794 | A1 | * | 6/2008 | Johansson | 705/36 R |
| 2008/0215497 | A1 | * | 9/2008 | Dillon | 705/36 R |
| 2009/0327015 | A1 | * | 12/2009 | Heyns et al. | 705/8 |
| 2010/0145873 | A1 | * | 6/2010 | Bakaya et al. | 705/36 R |
| 2010/0312719 | A1 | * | 12/2010 | Arnott | 705/36 R |
| 2011/0153508 | A1 | * | 6/2011 | Jhunjhunwala | 705/306 |
| 2012/0278200 | A1 | * | 11/2012 | van Coppenolle et al. | 705/26.35 |

OTHER PUBLICATIONS

Gill, S. (2003). Price—earnings ratio revisited. Finance India, 17(3), 937-951. Retrieved Feb. 5, 2014.*
International Search Report and Written Opinion for international application No. PCT/IB2010/003377 mailed May 23, 2011.
EPO: "Notice from the European Patent Office dated Oct. 1, 2007 concerning business methods", Official Journal of the European Patent Office, EOP, Munich, DE, vol. 30, No. 11, 2 pages.

* cited by examiner

*Primary Examiner* — Kito R Robinson
(74) *Attorney, Agent, or Firm* — Banner & Witcoff, Ltd.

(57) ABSTRACT

An instrument and system for consistent and objective comparison of stock exchange listed stocks, regardless of geographical market, business activity and trading currency is provided. The instrument is configured to compare stocks current trading prices, by producing iso-prices and iso-values. Two stocks' iso-prices have equal premiums and discounts, in relation to their respective long-term price trends. Iso-values, on the other hand, represent prices that correspond to the same compounding rate of stockholder return.

20 Claims, 17 Drawing Sheets

METHODS AND SYSTEMS FOR COMPARING STOCKS

CROSS-REFERENCE TO RELATED APPLICATION

This application is a non-provisional application of and claims the benefit of priority from U.S. Provisional Application Ser. No. 61/290,997, entitled "STOCK COMPARING INSTRUMENT AND SYSTEM," and filed Dec. 30, 2009, the content of which is incorporated herein by reference in its entirety.

FIELD OF ART

This invention generally relates to investment management. More particularly, aspects of the present disclosure relate to production and distribution of investment information.

BACKGROUND

Investment management relates to the professional management of various securities (stocks, bonds etc.) to meet specified investment goals for the benefit of investors. Investors may be private or public institutions (insurance and investment companies, pension or mutual funds, etc.) or private individual investors investing on their own, or based on professional advice.

Although many industries, today, are international and global in buying behavior and competition patterns, stock markets continue to show a predominately domestic character. Today's investors still seem to prefer to diversify their portfolios in domestic sector terms, rather than to pick stocks in a borderless world. Furthermore, investors often have little to no information about the relative price-value of competitive global stocks, at the time of their investments.

There may be several reasons for the above behavior. For example, there may be a lack of comparative stock data between stock exchange markets. Even where there is comparable stock data, the available data may be primarily geared towards intermediary actors and other professional investors. In another example, there may be a lack of a relevant stock valuation methodology, especially in terms of providing consistent price-value data for stocks in a unified system.

With respect to comparative stock data, there may be a lack of intrinsic value data on stocks, both domestically and internationally. Moreover, there might not exist a single source with a unified system of such global stock data. While stock information vendors often provide real-time stock data and company financials, the vendors have refrained from providing investors with currency and inflation adjusted intrinsic value data on stocks—both domestically and for stocks listed on foreign stock exchanges.

With respect to valuation, current and past trends in and the methodological basis for the modern professional practice of investment management may be divided into three categories or processes: Value Investment (VI), Modern Portfolio Theory (MPT) and Technical Analysis (TA). These methods are applied in practice by analysts, fund managers and investors. More importantly, they are integrated into a great variety of software products and systems, including automated algorithmic trading using neural networks, pattern recognition and predictive models to initiate trades. However, value investment, for example, uses variables that are focused on per-share analysis of the underlying asset and often disregard the stock and its position in and relative to the stock market on which it is traded. Hence, the VI methodology and its key ratios tend to neglect the stockholder perspective.

While MPT may represent a valuable set of analytical tools, in investment management practice, MPT may often be too advanced a methodology framework for the non-professional. Using MPT tools incorrectly is often worse than no use/analysis at all. For the same reason, MPT is seldom part of the information provided by analysts and brokers to stock market actors, beyond the simplistic and in practice short-term oriented Beta concept, which frequently is presented as a complementary variable, with the unwritten short-term rule for investors to avoid high-Beta stocks.

Technical Analysis (TA) is based on forecasting the future direction of stock prices and involves moving price averages and regressions. In practice, TA generally ignores the company behind a stock and—axiomatically—assumes that closing prices include all relevant stock information. Furthermore, according to TA, the future can be found in a stock's chart patterns, even though price is distinct from value, stocks have demand curves and margin costs that often differ from average and total cost per stock. Moreover, TA disregards the fact that stockholders get their yields by the general meeting's decided dividends to be paid-out.

Additionally, the growth in international hedge fund management has not only provided new investment opportunities, but also led to increasing transaction costs for investors. Oftentimes, hedge fund managers reap non-realized profit sharing from investors during bull markets, while taking little to no losses when bubbles burst, keeping investors locked-in. Other indirect transaction costs may include increasing prices, due to bad liquidity.

In view of the foregoing, there is a need for an improved valuation methodology that accounts for stockholder perspectives and that provides a coherent and consistent valuation to enhance the ability of investors, analysts, advisors and brokers to relate current market prices to a stock's financial track-record.

Furthermore, there is a need to be able to compare stocks, both domestically and across international markets and currencies.

Moreover, there is a need to provide such comparative stock valuation information on a global—stock exchange independent—basis, thereby enabling a more effective investment management practice to the benefit of financial investors, both institutional and other professional actors, as well as private.

SUMMARY

The following presents a simplified summary in order to provide a basic understanding of some aspects of the disclosure. The summary is not an extensive overview of the disclosure. It is neither intended to identify key or critical elements nor to delineate the scope of the disclosure. The following summary merely presents some concepts of the disclosure in a simplified form as a prelude to the description below.

One or more aspects of the present disclosure seeks to mitigate, alleviate or eliminate one or more of the above-identified shortcomings and deficiencies in the art and disadvantages singly or in any combination, by providing a stock comparing instrument and system.

Some aspects provide an instrument and information delivery system (e.g., a computing system having one or more processors and memory) that through a network such as the Internet enables users to compare stock exchange listed stocks, regardless of geographical market, business activity and trading currency. In one example, a stock comparison system may consistently process, e.g., for stockholders, investment decision-making relevant data and valuations, and compare stock's real time or daily closing prices using iso-prices and iso-values.

According to another aspect, the iso-prices of two stocks may have equal premiums and discounts, in relation to their respective long-term price trends, and iso-values are prices that correspond to the same rate of compounded stockholder return. The distribution of this information, making it available for analysts and investors world wide, may enhance economic decision-making and increase the efficiency of stock market's price mechanisms.

According to yet another aspect, a stock comparing instrument's model-based output is provided as a range of services, in the form of software products. These services are distributed through a real-time and daily updated information delivery system on various networks including local area networks, public networks, private networks, wide area networks such as the Internet and the like, and may be adapted both to personal computers, server systems, mobile devices, distributed systems and/or combinations thereof.

BRIEF DESCRIPTION OF THE DRAWINGS

These and other aspects, features and advantages of which the invention is capable will be apparent and elucidated from the following description of embodiments, reference being made to the accompanying drawings, in which.

DETAILED DESCRIPTION

Figure 1:
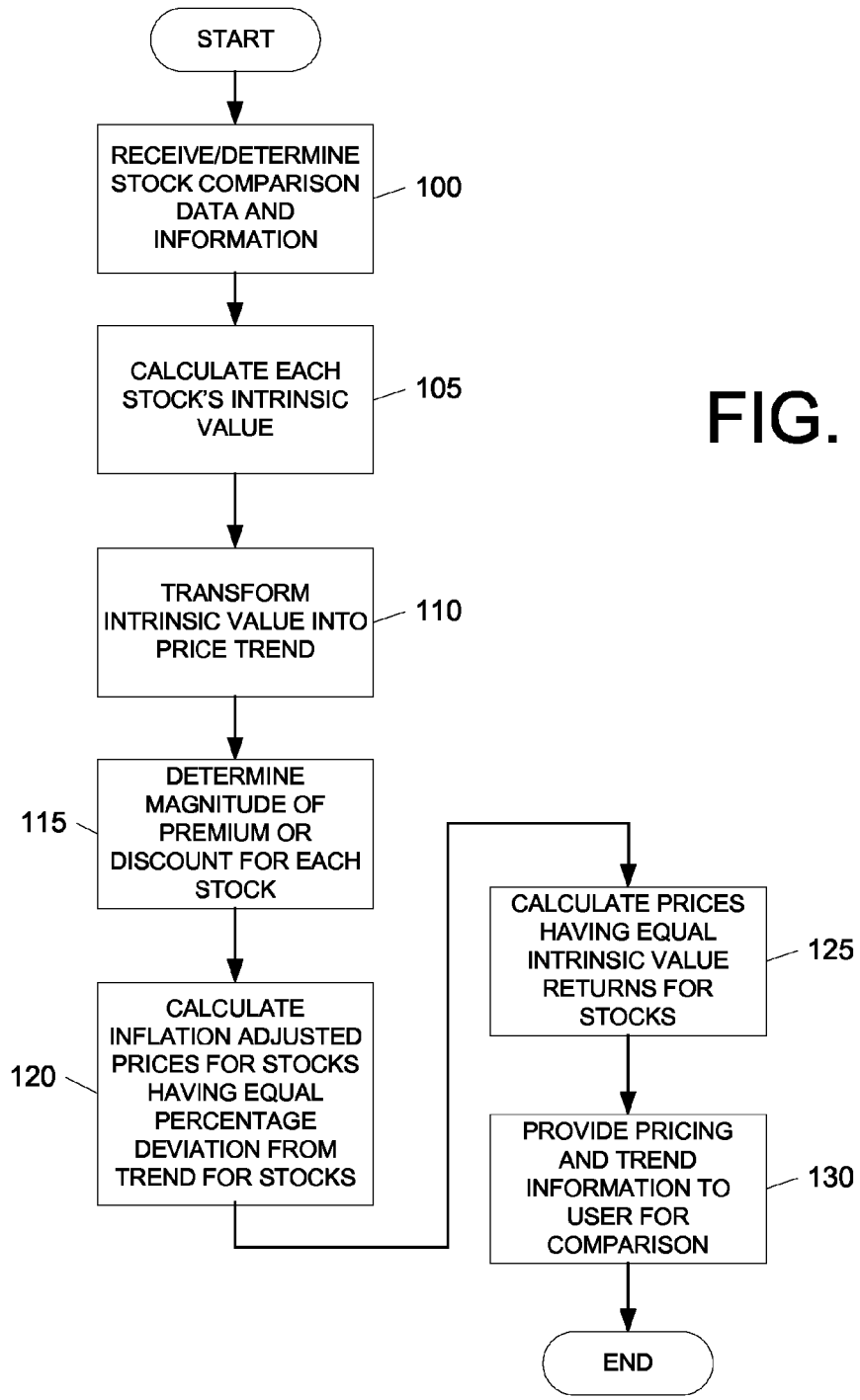
FIG. 1 is flowchart illustrating an example method for comparing two stocks, according to one or more aspects described herein.

Aspects of the present disclosure will be described in more detail below with reference to the accompanying drawings in order for those skilled in the art to be able to carry out the invention. Aspects of the present disclosure may, however, be embodied in many different forms and should not be construed as limited to the embodiments set forth herein. Rather, these embodiments are provided so that this disclosure will be thorough and complete, and will fully convey the scope of the invention to those skilled in the art.

Definitions

The following basic definitions are used throughout this disclosure. The definitions below are not intended to limit the scope of the aspects described herein. Rather, the definitions are used to provide a general understanding of the concepts and terms used herein.

Stock Price (P)=the inflation and sometimes currency adjusted past or present incremental closing price for a stock (e.g., when traded on a public market stock exchange).

Genetic Algorithm=a simulation programming technique (e.g., search heuristic) configured to find approximates to a search problem that evolves towards better solutions.

Expected Price (EP)=the inflation and sometimes currency adjusted median, average or weighted Stock Price (P), during a defined period, where the weighting is based on the relative number of days with a closing Stock Price (1-n).

Hold Pricing (HP)=a period (in some cases with a minimum length of time) in which the inflation adjusted price deviation of high and low closing Stock Prices (P) is less than a specified maximum.

First Base Period (FB)=the oldest Hold Pricing (HP) period recorded, with a minimum length of time and inflation adjusted hold pricing, represented by a date and an Expected Price (FP).

Last Base Period (LB)=the last (or most recent) Hold Pricing (HP) period with a minimum length of time and inflation adjusted hold pricing, represented by a date and an Expected Price (LP).

Compounded Average Growth Rate (CAGR)=the ratio of inflation and currency adjusted end value to inflation adjusted begin value raised to the power of 1/n years, where n is the number of years in the period being considered. The end value equals the sum of ending stock price and all dividends during the period, see equation 1.

$$CAGR(i,n)[\%] = \left(\frac{\text{end value}}{\text{begin value}}\right)^{\frac{1}{n}} = \left[\left(\frac{\text{share price}(n) + \sum_{i}^{n}\text{dividend}(i)}{\text{share price}(i)}\right)^{\frac{1}{n}} - 1\right] * 100 \quad (1)$$

Total Stockholder Value (TSV)=the weighted inflation adjusted Compounded Annual Growth Rate (CAGR) for a stock with a defined minimum years of track-record on a public market, between FB and LB with the Expected Prices FP and LP.

Total Stockholder Norm (TSN)=the median, average or weighted Total Shareholder Value (TSV) of a defined population of stocks, i.e. for a specific market, or market sector or globally.

Long-Term Price Trend (LTP)=the inflation adjusted Expected Price (FP), at the end of a Last Base Period (LB), times Total Stockholder Value (TSV) and compounded annually.

Iso-Prices (IP)=two stock's prices (Px1-Py1, Px2-Py2 ... Pxn-Pyn), at a specific and same time, with equal percentage deviation (+/−) from their respective LTP.

Iso-Values (IV)=two stock's prices (Px1-Py1, Px2-Py2 ... Pxn-Pyn), at a specific and same time, with equal TSV returns.

The Iso Price-Value Instrument and System

An instrument and system that enables consistent real-time comparison of pairs of stocks to users, worldwide is provided. The two stocks can be listed on any public market, worldwide. Comparison is possible regardless of currency, business activity and industry, as well as present stock prices and inflation rates.

The instrument allows an investor or other user to establish at what prices two stocks are equally priced and determine if one is currently trading at a higher premium or lower discount than the other. Another advantage of the instrument is the ability to compare two stocks to the total population of stocks, in a market or market sector. These are typical practical information and decision-making problems for any investor, analyst or broker in stocks. Often, these comparison problems are reinforced because of different stock price levels. If, for example, two stocks (x, y) have closing prices (P) of ($P_x$=10) and ($P_y$=100), it has been proven in psychological studies that $P_x$ is found "cheaper" than $P_y$. For so called "penny-stocks," this effect has many times been exploited by majority stockholders, against careless small investors, by using stock-splits to sustain ultralow stock prices.

FIG. 1 illustrates an example process by which the stock comparator system may be used to compare stocks. In one arrangement, the two (or more) stocks for which comparison is desired are selected on demand by a user of the instrument and system through, e.g., a user interface. The user interface may be generated by a software program that is available and/or executable through a network such as the Internet or locally on computers and mobile devices. The software may also be executed across multiple systems in a distributed manner.

In step 100, data and information used for the stock comparison is determined or retrieved. The data and information may include input variables such as inflation adjusted Stock Prices (P), inflation adjusted Stock Dividends (D) and Currencies (C). The data and information may be retrieved, in one or more arrangements, from a database. Alternatively or additionally, data and information may be requested and received from external (e.g., remote network) sources and/or determined using Genetic Algorithm (GA). For example, current or new P data may be streamed real time directly from stock exchanges or indirectly via vendors, or may be updated daily with closing prices. Currency C data and/or Cross-Currency Factors C are stored with daily rates, while new D data may be updated on a periodic or aperiodic basis. In some instances, the data and information may be manually specified. According to one or more arrangements, the input variables may cover a stock's history of a minimum of ten years. In other arrangements, the input variables may cover more than twenty years of a stock's history.

As noted herein, equally priced (e.g., equalized) prices between two stocks may be termed Iso-Prices (IP). Equally priced refers to the same intrinsic value to stockholders, according to one or more arrangements. The Iso-Prices are inflation and currency adjusted, which makes it possible to consistently and objectively compare stocks, regardless of stock exchange listing. Hence, the stock comparing instrument and system may be applicable on a global level and may unite all listed stocks in a single comparative system.

Pairs of prices corresponding to equal intrinsic value may be termed Iso-Values (IV). Also, Iso-Values may be inflation and currency adjusted, in order to enable cross-border stock comparisons, with the same instrument and system.

As presented in FIG. 1, in step 105, to establish Iso-Prices (IP) and Iso-Values (IV), each of the stock's intrinsic value may be calculated based on the input data determined in step 100. According to one or more embodiments, a stock's intrinsic value may be termed Total Stockholders Value (TSV) as described in further detail below. Subsequently in step 110, each of the stock's intrinsic value or TSV return may be transformed to a price trend (e.g., Long Term Price Trend (LTP)), as also discussed in further detail below. Thereafter, an amount by which each stock is currently trading at a premium or discount may be determined, relative to its intrinsic value in step 115. This may be performed, for example, by comparing the stock's last closing inflation adjusted P, with LTP. Inflation adjusted Iso-Prices (IP) may then be calculated in step 120 as pairs of prices for two stocks with equal premium (P>LTP) and discount (P<LTP) rates from their respective LTP. Furthermore, Iso-Values (IV) may be calculated as pairs with the same TSV return and reference prices in step 125. Additionally or alternatively, the pricing information (e.g., IP and/or IV) and trend information (e.g., LTP) may be provided to the user as a basis for comparison between multiple stocks, as shown in step 130.

Calculating and Transforming TSV to LTP

Figure 2:
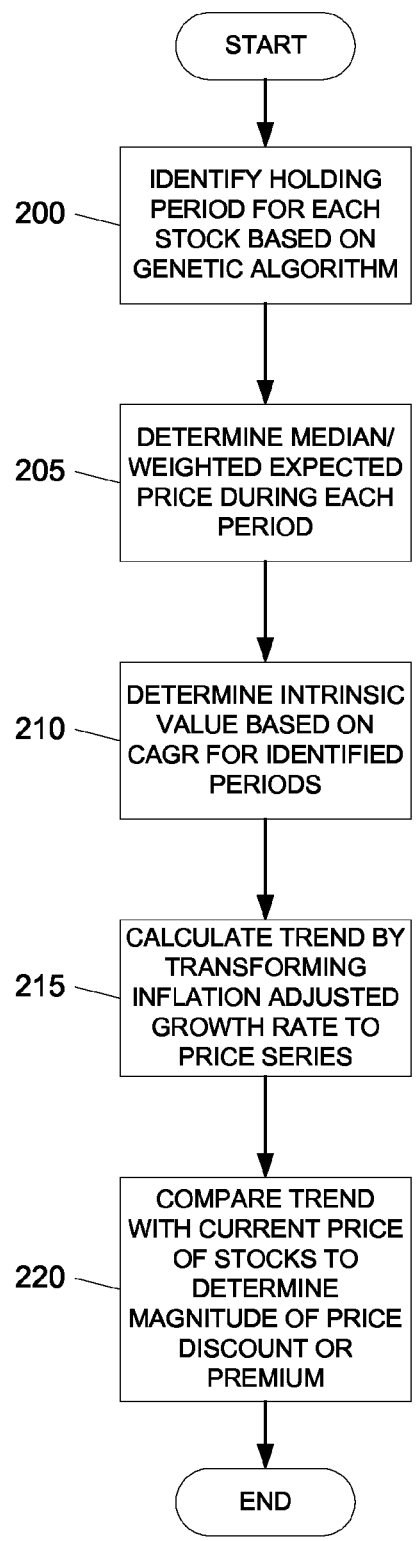
FIG. 2 is a flowchart illustrating an example method for calculating Total Shareholder Value (TSV) and transforming TSV to a Long-Term Price Trend (LTP) for a stock, according to one or more aspects described herein.

Trends are generally time derivatives. Hence, a growth rate can be transformed to a price trend. FIG. 2 is a flowchart illustrating an exemplary method for calculating and transforming TSV to LTP for a stock, according to an embodiment. The starting point for calculating TSV is to use an inflation adjusted P and D data series and the inflation and currency adjusted compounded annual growth rate (CAGR) algorithm, to calculate the return for each past year to the present. Empirical testing of CAGR among stock populations has shown that a minimum of ten years may be required, both in order to establish a significant and reliable track-record, to include more than one full business cycle and to absorb the compounding effects of returns, both in terms of P and D.

Estimates of trends are sensitive to points at the start and end of a data set. A time series of CAGR, normally, reduces variations in compounded returns with time. The variation in return is, primarily, due to the inherent character of P that grow, decline and hold in trends. According to an embodiment, in order to calculate the TSV, two periods of Hold Pricing (HP) are identified by a Genetic Algorithm (GA) searching two solution domains in step 200, with the fitness function having as long a period and as small of price deviations as possible. For example, according to an embodiment, and depending upon how many years of data and period data for each year is available, a First Base Period (FB) and a Last Base Period (LB) are identified and defined by the GA. From the inflation adjusted FB and LB price series, the median or weighted Expected Price during each period, e.g., an FP and an LP corresponding to the FB and LB, respectively, can be calculated using the same Genetic Algorithm, GA in step 205.

According to an embodiment, the TSV is determined based on the CAGR in step 210 for the period FB and LB, including FP, LP and D data for the period. For example, the TSV may be defined as being equal to the CAGR. The TSV is presented as a growth factor (1.x) or a percentage (x %). In some cases, the growth factor and percentage can be negative. Even though it is not likely that stockholders accept negative returns long-term, such stocks do exist.

For obvious reasons, a long-term trend value like TSV is more stable than any price curve. It might not be affected or changed by stock-market index changes, or any extraordinary deviation in P, positive or negative. In one or more arrangements, the only factor that may lead to a changed value in TSV is when the stock reaches a new period of Hold Pricing (HP). Then, the value of TSV is recalculated by the Genetic Algorithm (GA), with a new value for LB and LP.

According to one or more aspects, TSV might not be the "actual" return. Instead, TSV may represent an inflation adjusted value that describes the rate at which an investment in a stock would have grown, if it grew at a steady rate, smoothing out the returns, during a long-term period. TSV might not, for example, take the reinvestment value of dividends, or taxes into account. Rather, TSV may represent an objective measure of a stock's track-record and stockholders intrinsic value, from holding the stock long-term.

At the same time, there may be reasons to expect a stock to sustain its TSV return. For example, over time, a stock which has had a TSV of 1.08, or 8% inflation adjusted compounding growth, for more than ten years, is more likely to long-term continue at this trend than substantially changing the trend. Of course there are deviations from the trend, both positive and negative, some minor other substantial, but track-record from the past has proven that prices return towards the TSV trend. Hence, the long-term track-record character of a stock's TSV.

Conventional investment analysis often favors rolling price averages, to provide a long-term benchmark (typically in Technical Analysis) and use short-term deviation averages as a risk/return reference (typically in Modern Portfolio Theory). There are many disadvantages to the use of rolling price and deviation averages as a valuation method for comparing stocks, both domestic and foreign.

First, rolling prices might not separate deviations from the trend, which means that single spurts of major and extraordinary deviations have major effects upon the rolling average benchmark. This means that price growth and deviations often draw upon positive reinforcing feedbacks, something that makes stock markets unnecessary volatile and less efficient.

Second, the rolling price average benchmark disregards dividends and, hence, tends to overvalue growth stocks to value stocks, in spite of the fact that empirical research has constantly proven that relative long term returns is the reverse. Typically, therefore, this market behavioural dysfunction is reinforced during bear market sentiments.

Third, both Alpha and Beta do change over time and, specifically, they do change substantially between periods of hold pricing and more dynamic pricing, something which MPT normally does not take into account—neither in theory or practice.

Fourth, rolling price average information provided to the market might not normally include inflation and currency-adjusted prices and data variables, which is a pre-requisite for coherent multi-currency international comparisons.

The TSV may solve these issues of rolling price and deviation averages, and provide a relevant, consistent and practical long-term benchmark for any stock, domestic or foreign.

In order to make the TSV operational for practical investment analysis, it may be transformed from an inflation adjusted compounding growth rate to a price series including past, present and future: the Long-Term Price Trend (LTP) in step 215. This may be achieved by multiplying LP with TSV, and compounding it from LB on an annual basis. LTP may then be compared with the current P to establish if and how much a stock is priced with a premium (P>LTP) or discount (P<LTP) in step 220. For example, the difference between the LTP and the P may be determined. If the difference is greater than 0 (e.g., P>LTP), the stock may be trading at a premium while if the difference is less than 0 (e.g., P<LTP), the stock may be trading at a discount.

Calculating Iso-Prices

Iso-Prices (IP) typically answer what-if questions from users like: If stock X is growing with 30% during next year, how much does the stock Y has to grow, in order to be equally priced? Which of the two major stocks in an industry or market is currently higher priced, and how much? If I own two bank stocks and have to sell one, which one should I sell? At what discounts and premiums should I swap stocks in my portfolio?

Overall, the IP output enables users to increase their awareness of stocks' relative price-value position. This information and knowledge can be used for stock-picking and buying-selling stock-options, in different geographical markets and market sectors. It can also, for example, be used as a basis for implementing stop-loss rules in a fund or portfolio, as well as for an investment management firm, stock-broker or merchant bank to control the actions of its team members, through business rules based software.

Figure 3:
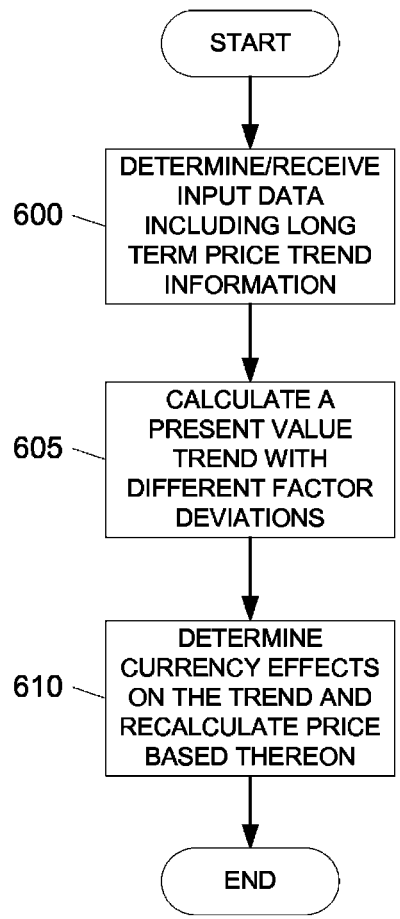
FIG. 3 is a flowchart illustrating an example method for calculating Iso-Prices (IP), according to one or more aspects described herein.

FIG. 3 is a flowchart illustrating an exemplary method for calculating Iso-Prices (IP), according to an embodiment. The determination of IP may include, in step 600, determining or receiving input data such as LTP, which, as described above with respect to FIG. 2, may be a multiplication of LP with the growth factor TSV and compounding annually from LB to present value, which here is termed IP-LTP.

The fundamental base from which a wide range of IPs can be calculated is the present value IP-LTP. Accordingly, in step 605, the present value IP-LTP may be calculated along with different Factor Deviations (F). For example, if two stocks (x, y) with IP-LTPx=5.0 USD and IP-LTPy=10.0 USD, a simplified table with different F can be constructed, as follows:

| IPx | F | IPy |
|---|---|---|
| 7.0 | 1.4 | 14.0 |
| 6.0 | 1.2 | 12.0 |
| IP-LTPx | 1.0 | IP-LTPy |
| 4.0 | 0.8 | 8.0 |
| 3.0 | 0.6 | 6.0 |

Accordingly, the stock comparator system and instrument may deal with any difference in IP-LTP between the two stocks. The system may also address any difference in current trading prices, Px and Py. For example, regardless of the premium (P>IP-LTP) and/or discount (P<IP-LTP) of Px and Py, the comparator system and instrument may also establish how much higher or lower priced one stock is to the other, and at what price one stock would have to grow or decline to be equally priced with the other.

Currency adjustment factors C may be important to all cross-border and cross-currency stock comparison. Accordingly, in step 610, currency effects on LTP may be determined and the IP re-calculated based on those currency effects. Currency changes affect both the LTP and new current P of each stock, while it might not affect how the Iso-Prices are calculated. Hence, the USD comparison example above could have been any combination of currencies. If, for example stock y in the above example was Swedish Kronas and converted from SEK, and the C SEK-USD ratio was 10.0, the below effects would have been calculated.

| IPx (USD) | F | IPy (USD1) | IPy (USD2) | IPy (SEK) |
|---|---|---|---|---|
| 7.0 | 1.4 | 14.0 | 12.6 | 140.0 |
| 6.0 | 1.2 | 12.0 | 10.8 | 120.0 |
| IP-LTPx | 1.0 | 10.0 | 9.0 | IP-LTPy |
| 4.0 | 0.8 | 8.0 | 7.2 | 80.0 |
| 3.0 | 0.6 | 6.0 | 5.6 | 60.0 |

And, if the SEK-USD ratio changes to 9.0, but with no effects upon IP-LTP in SEK, the IP-LTPy changes from IPy (USD1) to IPy (USD2). This is an advantage for the Iso-Price instrument, since it is difficult to intuitively compare stocks present pricing with combinations of different inflation-rates, currencies and track-record, at the same time.

Iso-Price Model Design

Figure 4:
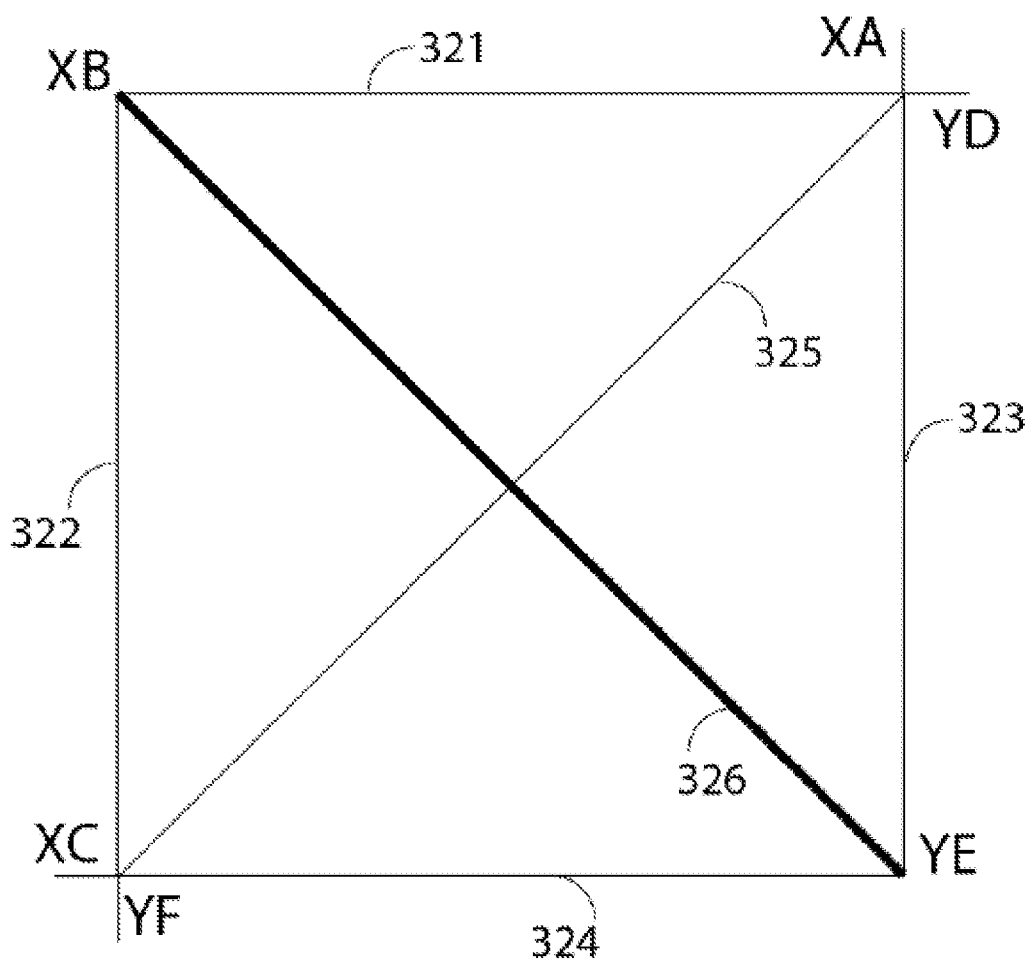
FIGS. 4-6 show example visualizations of stock price comparisons using an Iso-Price (IP) model, according to one or more aspects described herein.

According to one or more aspects, a matrix structure visualization including the stock comparator's Iso-Price (IP) model design is displayed in FIG. 4. The two stocks X and Y are represented in the design model by the axis XB to XA 321 and XB to XC 322 for stock X, and YE to YD 323 and YE to YF 324 for stock Y. For example, axes 321 and 322 may correspond to the price of stock X while axes 323 and 324 may correspond to the price of stock Y. The two stocks' Iso-Price (IP) for LTP, i.e. IP-LTP, is represented by the straight line between X's B and Y's E, i.e. XB-YE 326. B and E may be positioned at the opposite corners of the rectangular/square graph, for example. This means that the triangular area XB-XA/YD-YE is for premium pricing, while the triangular area XB-XC/YF-YE is for discount pricing, in relation to IP-LTP, i.e. XB-YE 326.

Figure 5:
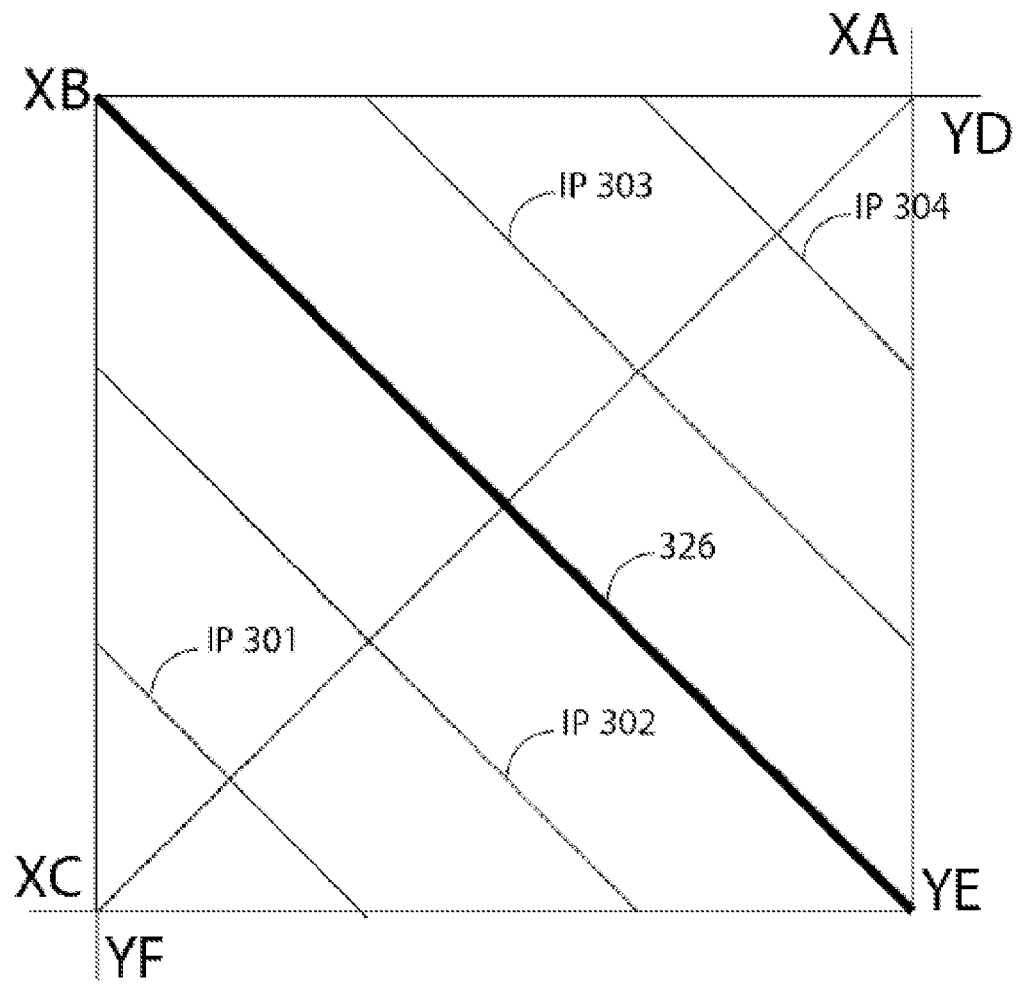

Percentage deviations (+/−) from the IP-LTP line XB-YE 326 are presented in FIG. 5, with four lines with IPs, according to an embodiment. Discount prices, or negative deviations, i.e. <IP-LTP, goes from XB towards XC for X, and YE to YF for Y, such as IP 301 and IP 302, where the discount of IP 301>IP 302. Premium prices, or positive deviations, i.e. P>IP-LTP, goes from XB towards XA for X, and YE towards YF for Y, such as IP 303 and IP 304, where the premium of IP 303<IP 304.

In principal terms, and according to an embodiment, the model in FIG. 5 is a graph of indifference curves with two stocks, according to the accumulated trading of the two stocks on the market. Hence, the relationship between the IP may be complete and transitive; an economic investor—being a seller—prefers IP 302 to IP 301 and IP 303 to IP 302 and IP 304 to IP 303, therefore he prefers IP 304 to IP 301, while as a buyer his preferences are the reverse. IP can never cross and are perfect substitutes, since the curves are straight, and IP prices are only received from the respective axis values.

Additionally, the discount scale, XB to XC 322 and YE to YF 324, ends with 0, at the point XC-YF, since there are no negative prices for stocks. The premium scale for XB to XA 321 and YE to YD 323 has no theoretical limitations, while the model design adapts to the P and LTP variables to present more relevant IPs. For example, the graph may display a premium scale that extends to 5%, 10%, 25% or the like of a present P, IP or other value of the stocks. In some instances, the price or value of only one of the two stocks being compared might be used to set the premium scale. The discount scale may be similarly determined and generated. Additionally or alternatively, the scale can also be algorithmic, whenever needed, for example when a stock's present price-levels are hundreds of percent more than IP-LTP.

Figure 6:
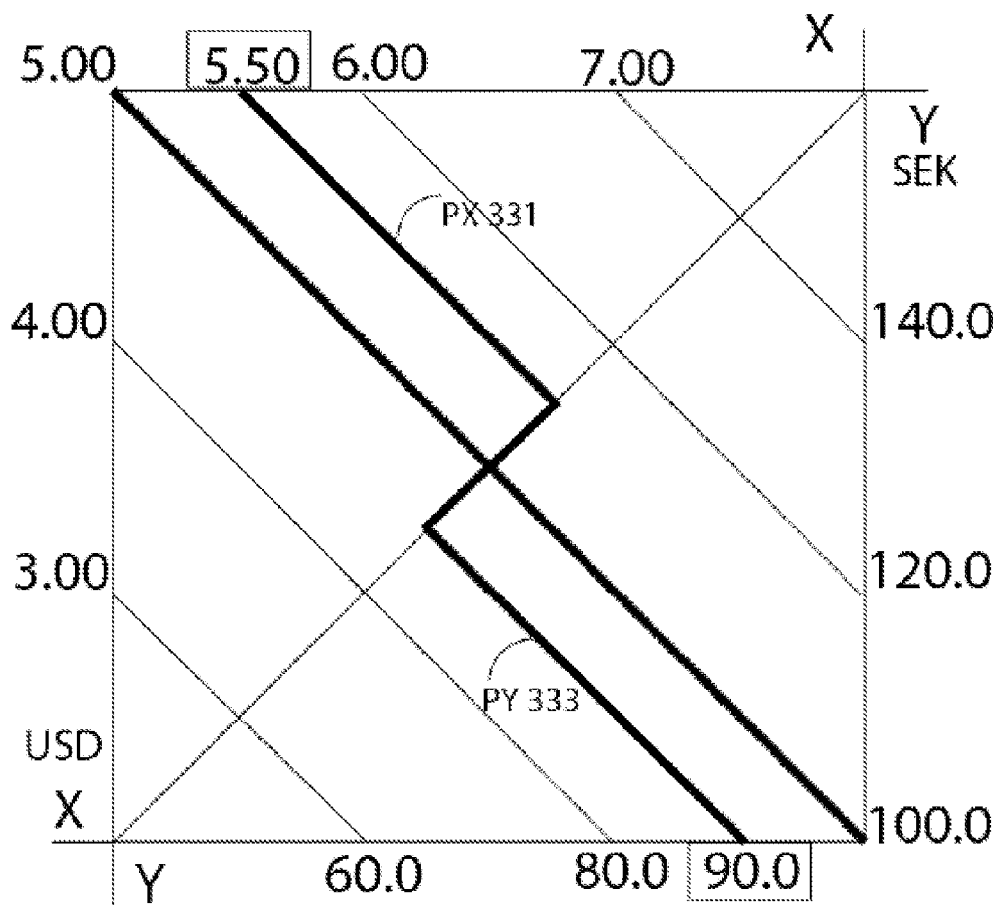

In FIG. 6, the present closing prices PX 331 and PY 333 are introduced to establish a principal model of the present price-value position for the US stock X and the Swedish stock Y. In this example, stock X's trading price is $5.50 USD, which represents a premium of 1.15 or 15%, while the stock Y is trading at 90.0 SEK, representing a discount of 0.9 or 10%. From the Iso-Prices in FIG. 6, it can also be interpreted that for stock Y to be equally priced with stock X, stock Y has to grow from its present 90.0 SEK price to 110.0 SEK, while stock X has to decline from 5.50 USD to 4.50 USD to be equally priced with stock Y. This information may be displayed in the graph as part of a graphical user interface, for example. Accordingly, users may view the information to understand which stock is a better buy and/or how they compare in price and value relative to one another.

Figure 7:
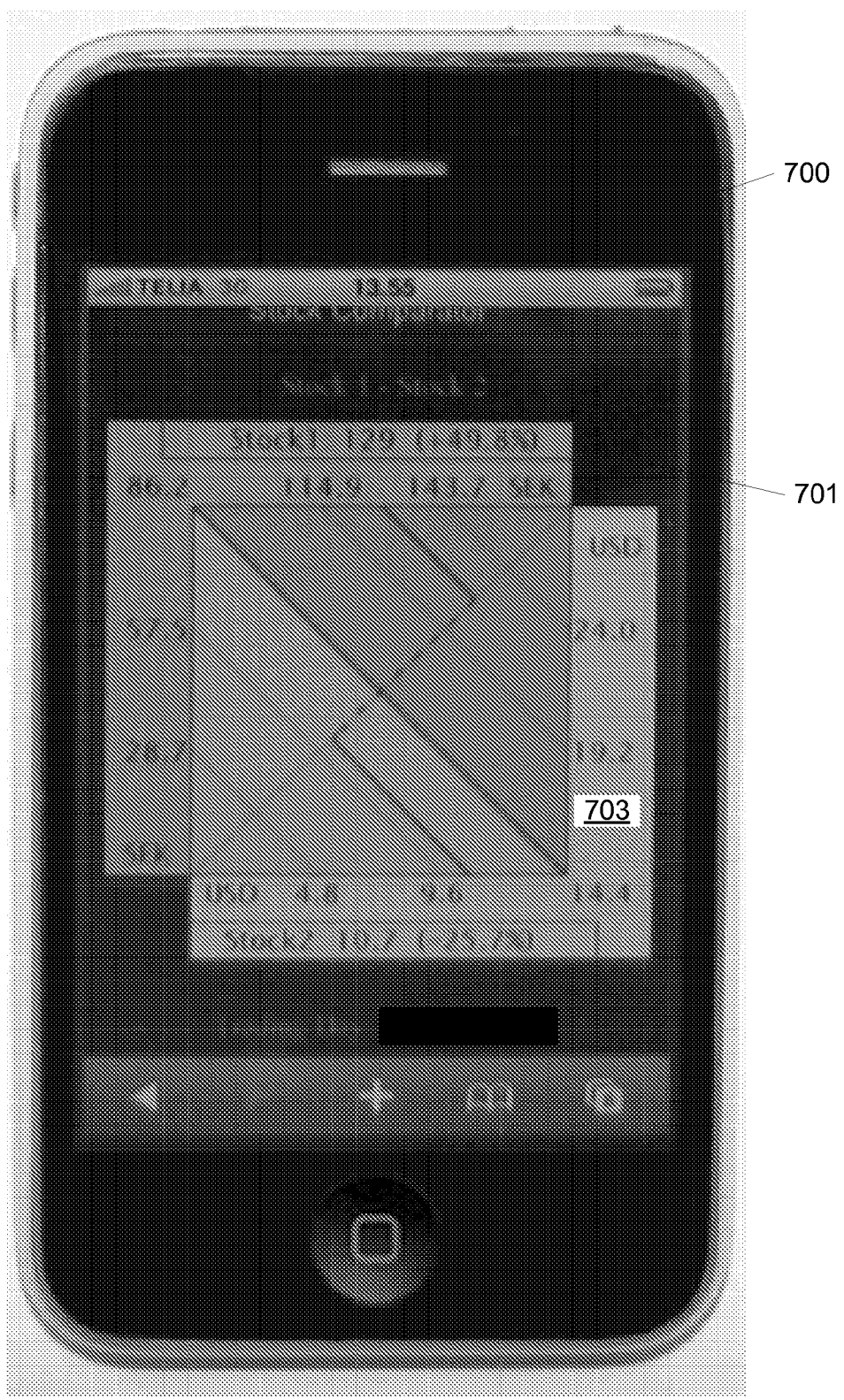
FIG. 7 illustrates a user interface of a mobile display device providing a stock comparison based on Iso-Price (IP) output, according to one or more aspects described herein.

FIG. 7 illustrates a display of a stock comparator application with Iso-Prices executing on a mobile display device 700. As illustrated, display 701 of device 700 is used to display a stock comparator graph 703 based on iso-prices. Display 701 may include a touchscreen interface, tactile buttons, microphones and speakers and various other components. Accordingly, a user may select stocks that they wish to compare using, for example, a touchscreen interface. Display 701 may be configured to display any visual elements including any of graphs, models, prices, stock information and designs, including those described herein.

Figure 8:
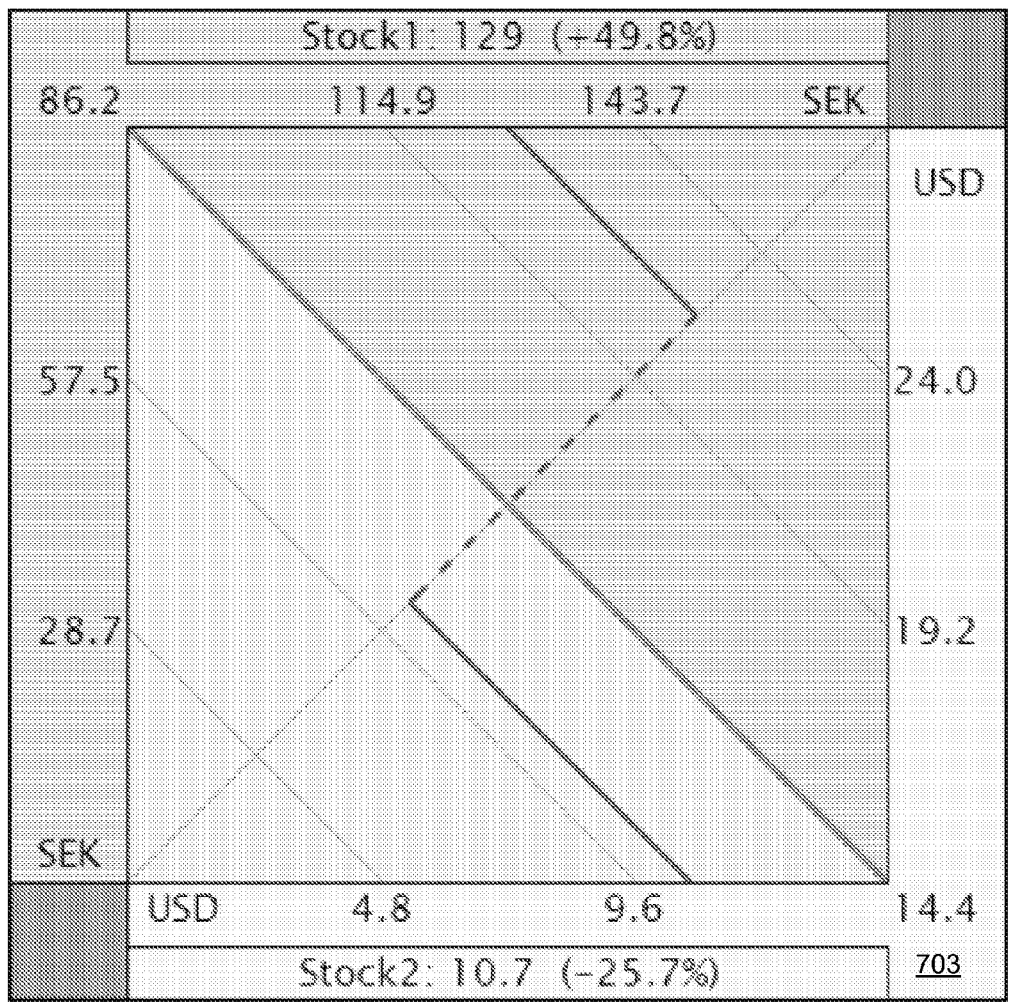
FIG. 8 illustrates an enlarged view of the user interface of FIG. 7.

FIG. 8 illustrates an enlarged view of graph 703 as displayed on display 701 (FIG. 7) of mobile display device 700 (FIG. 7). In graph 703, Stock1 and Stock2 are compared with one having a value in Swedish kronas (SEK) and the other having a value in U.S. dollars (USD).

Figure 9:
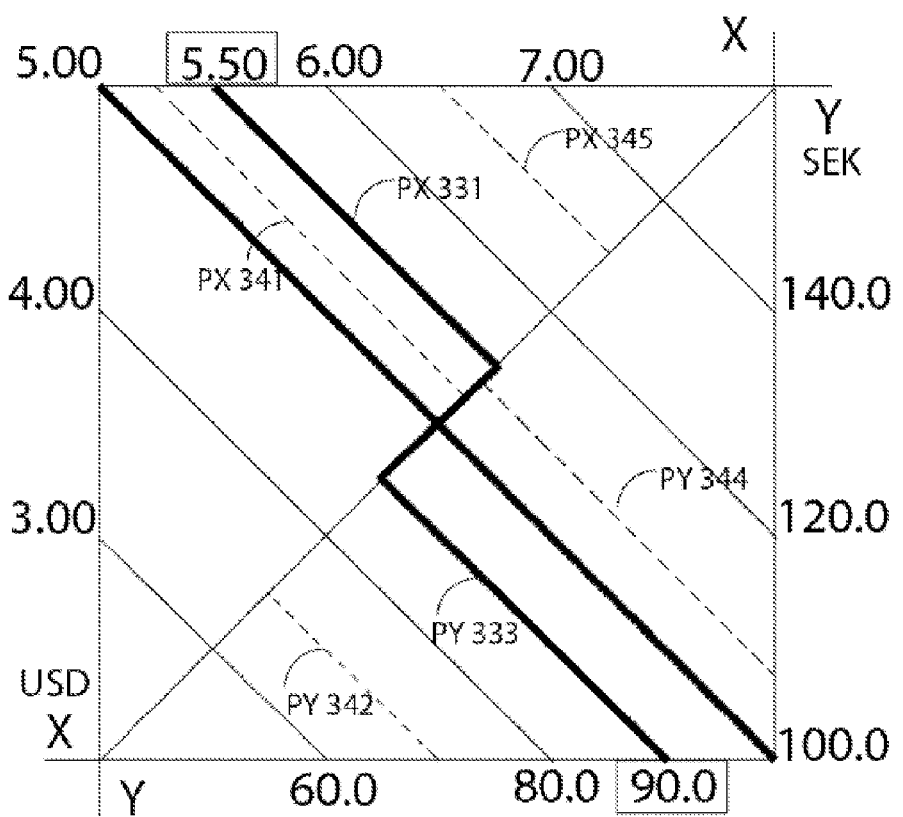
FIG. 9 illustrates example Iso-Price (IP) output of a stock comparison tool with added trading data, according to one or more aspects described herein.

According to an embodiment, the Iso-Instrument can produce Iso-Prices for pairs of stocks and include Stock Price (P) momentum data in the model output. In FIG. 9, for example, lines PX 341 and PY 342 represent the last three month's low price, indicating oversold conditions in the market, while the lines PX 345 and PY 344 indicates an overbought condition. Using such a graph and stock comparator system and instrument, the price bandwidth between PX 341-PX 345 and PY 342-PY 344 may be analyzed and presented to a user. The price bandwidth in the illustrated example shows X fluctuating distinctly less than Y. Additionally, X appears to be positioned closer to an oversold condition, in spite of trading at a premium. Y, on the other hand, is trading at a discount at mid-range of a greater bandwidth.

According to an embodiment, the three months high-low lines may also be provided as a TA oscillating indicator, fluctuating above and below the price line, such as the Relative Strength Index (RSI), comparing the size of recent daily price gains to the size of recent daily price losses. The result would be plotted as a line within a band which fluctuates between 0 and 100, and levels at 70 would be considered a high level to the upside, and 30 a low level to the downside.

Calculating Iso-Values

The applicability of the stock comparator system and instrument's production of Iso-Values (IV) is different than Iso-Prices (IP). While IP measures price-deviations from the long-term stockholder return trend, IV analyzes a population of stocks in a defined market or sector, and compares two stocks' position within this population.

The IV generally corresponds to a set of pairs of prices for two stocks, e.g., pairs of prices which the market has assigned an equal rate of compounded stockholder return. These pairs of prices can, therefore, be represented by linear indifference curves that connect IV for two stocks. From IV a marginal rate of substitution between two stocks can be calculated. If the economic investor's utility function for two stocks (X, Y) is of the form U (IV−X, IV−Y)=A(IV−X)+B(IV−Y), then the marginal utility of X is A, and Y is B. The slope of the indifference curve or marginal rate of substitution between the two stocks (X, Y) is dIV−X/dIV−Y=−B/A.

The marginal rate of substitution, then, is a price-multiplier between two stocks, indicating that the prices for two stocks (PX, PY) is of the form PX=−B/A*PY. This may of course be both important and practical information for investor's decision-making, when comparing stocks with different price levels, especially when all other traditional variables don't work in practice (e.g., when a stock is loss-making and the PE and PEG variables become non-functional, when discounted cash-flow (DCF) per share is practically impossible to calculate, etc.).

Typically, the IV output answers what-if questions like: The price of X is PX', what should the price PY' be for Y'? What rate of stockholder return are X and Y trading at? My stockholder return target is 10% p.a. (percent annually), what present prices does that represent for X and Y? What level of long-term stockholder return for X and Y corresponds to my stop-loss rule?

Overall, the IV output enables users to increase their awareness of stocks relative price-value, and at what prices for two stocks the market has proven to be indifferent—i.e. this is a consistent and objective presentation of the stocks track-record. This information and knowledge can be used for stock-picking and buying-selling stock-options, in different geographical markets and market sectors. It can also, for example, be used as a basis for implementing stop-loss rules in a fund or portfolio, as well as for an investment management firm, stock-broker or merchant bank to control the actions of its team members by business rules software.

Figure 10:
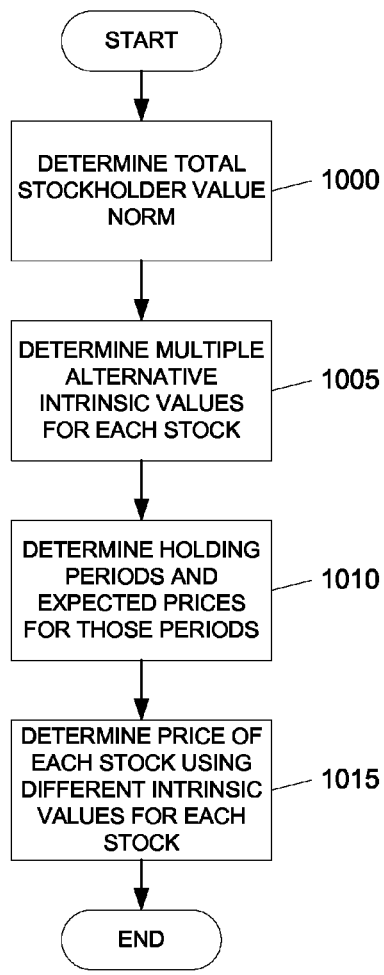
FIG. 10 is a flowchart illustrating an example process for calculating Iso-Values (IV), according to one or more aspects described herein.

FIG. 10 is a flowchart illustrating an example method for calculating Iso-Values (IV), according to an embodiment. The starting point in this process is step 1000 in which the Total Stockholder Value Norm (TSN) (e.g., TSN 426 of FIG. 11) is determined. The TSN may be the median or weighted TSV for each stock in a population, either being a stock exchange, geographical market, market sector or globally. In step 1005, multiple alternative TSVs may be calculated using the TSN and multiplying it with a set of pre-decided factors. The factors are decided based upon the best possible presentation in the output model of the system. Subsequently, in step 1010, the system may determine first base periods (FB) and expected prices (FP) for each of multiple stocks, e.g., stocks X and Y. Using the FB, FP and TSV, an IV is determined for each of stocks X and Y in step 1015. In one or more arrangements, different TSVs are used for determining the IV for each of stocks X and Y. For example, from the FB for X and FB for Y, FP for X and FP for Y are multiplied, and compounded annually, with their respective TSV, in order to calculate the IV for stock X and IV for stock Y, as in FIG. 10.

The TSN may possess statistical and important practical characteristics as a benchmark. It has for example always a higher probability than any portfolio, or index. For the individual investor, i.e. marginal buyer or seller, it is probably as close to a definition of a market you can come. At the same time, almost any private investor can buy the market and hold it long-term, by investing in the TSN, i.e. purchasing one stock lot of each stock in the market and, hereby, minimizing the risk of deviations from the long-term return trend of stock investing.

The Iso-Instrument's Iso-Value Model Design

Figure 11:
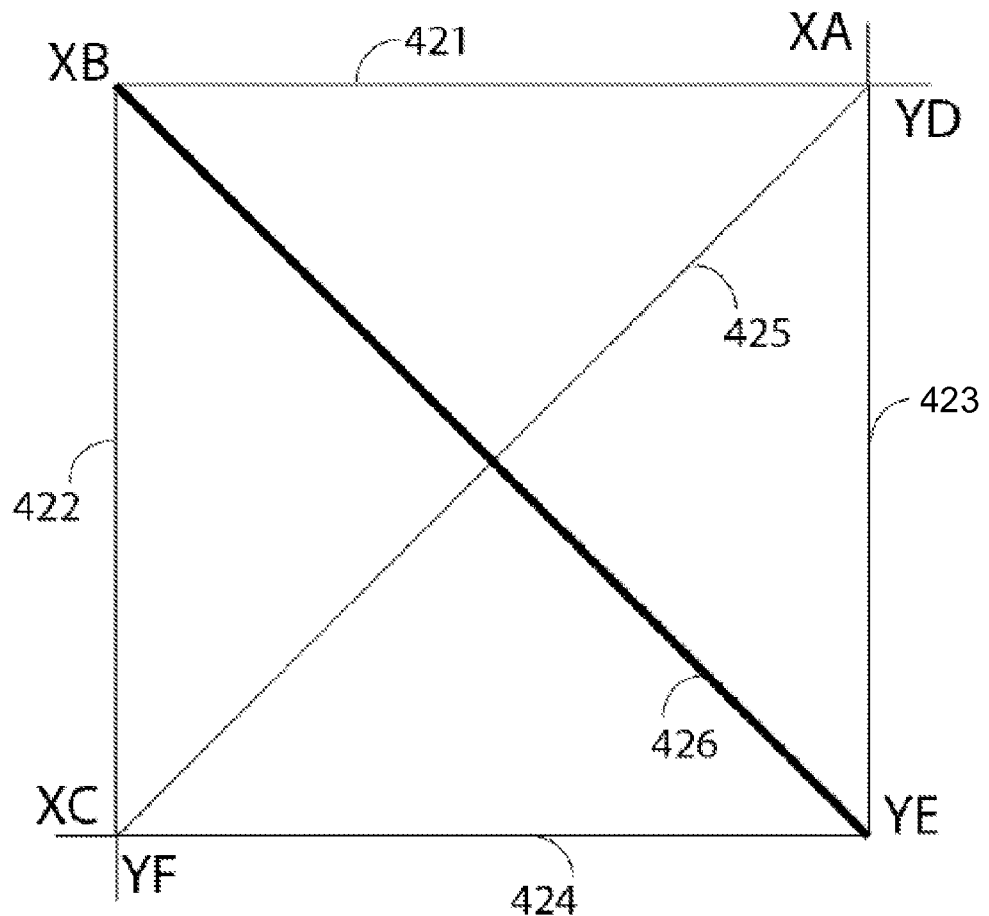
FIGS. 11 and 12 illustrate an example Iso-Value (IV) model that may be used in a stock comparison tool and/or system, according to one or more aspects described herein.

FIG. 11 shows an example visualization of the stock comparator system and instrument's Iso-Value (IV) model, with the basis axis design of the matrix structure, according to an embodiment. The two stocks X and Y are presented in the design model by the axis XB to XA 421 and XB to XC 422 for stock X, and YE to YD 423 and YE to YF 424 for stock Y. The matrix structure is characterized by stock prices for stock X displayed along axes 421 and 422 and stock prices for stock Y displayed along axes 423 and 424. Corners or vertices XB and YE may correspond to the prices of each stock X and Y having the same deviation from their respective LTPs.

The straight line between X's B and Y's E, i.e. XB-YE 426 is represented by a selected norm, Total Stockholders Value Norm (TSN) 426. This means that the triangular area XB-XA/YD-YE is for stocks with premiums or outperforming returns (TSV 250>TSN 426), while the triangular area XB-XC/YF-YE is for stocks with non-performing returns (TSV 250<TSN 426).

Figure 12:
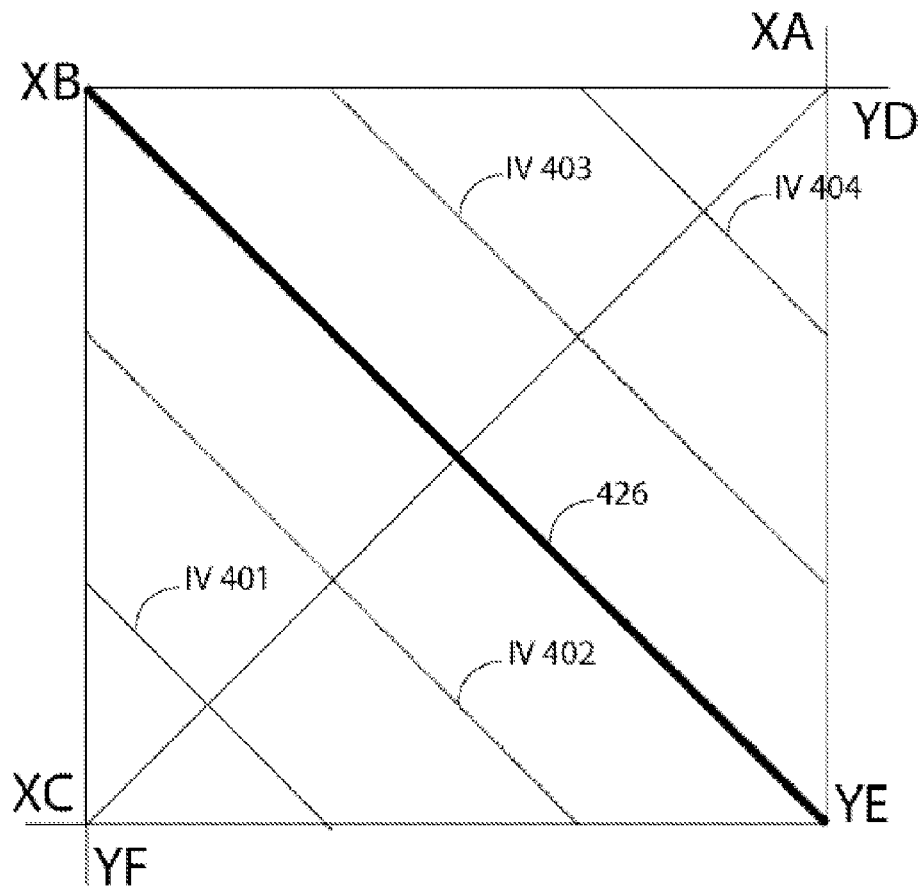

The TSN line, XB-YE 426, is also presented in FIG. 12. In FIG. 12, however, XB-YE 426 is displayed with four Iso-Value (IV) lines, according to an embodiment. Typically, these four lines represent statistical deviations from TSN 426, but can also be percentage deviations. Non-performing returns, i.e. <TSN 426, goes from XB towards XC for X, and YE to YF for Y, such as IV 401 and IV 402, where IV 401 is less performing than IV 402. Performing returns, i.e. TSV>TSN 426, goes from XB towards XA for X, and YE towards YF for Y, such as IV 403 and IV 404, where IV 404 is more outperforming than IV 403.

The statistical distribution of TSV is different in different markets and might not be expected to be normally distributed, like a Bell curve. Still, for presentation reasons, it is relevant to compare two stocks' deviation, not only in terms of deviation to the norm, TSN, but also in relation to the population of stocks as a whole. Therefore, according to an embodiment and applying the 3-sigma rule, as in FIG. 12, the lines IV 402 and IV 403 correspond to one standard deviation σ>0 away from μ, i.e. TSN, where the standard deviation of X (IV 402 and IV 403) is the square root of the value of $(X-\mu)^2$, i.e. $\sigma = \sqrt{E[(X-\mu)^2]}$.

The analysis may utilize a normal distribution when the population of stocks is about a 68% confidence interval of TSV values (e.g., within 1 standard deviation of the mean). This can be achieved by testing with the root-mean-square formula:

$$\sigma = \sqrt{\frac{1}{N}\sum_{i=1}^{N}(x_i - \bar{x})^2},$$

where $\bar{x}$ is the arithmetic mean of the TSV values, $x_i$, and is defined as:

$$\bar{x} = \frac{x_1 + x_2 + \ldots + x_N}{N} = \frac{1}{N}\sum_{i=1}^{N}x_i.$$

Equally, the lines IV 401 and IV 404 in FIG. 12 correspond to two standard deviations a away from TSN 426, and should, with a normal distribution, represent about a 95% confidence interval of the TSV values from the population of stocks in the market, while the expectation for most markets and sectors is that the 3-sigma population is greater than the 5% of the normal distribution.

Figure 13:
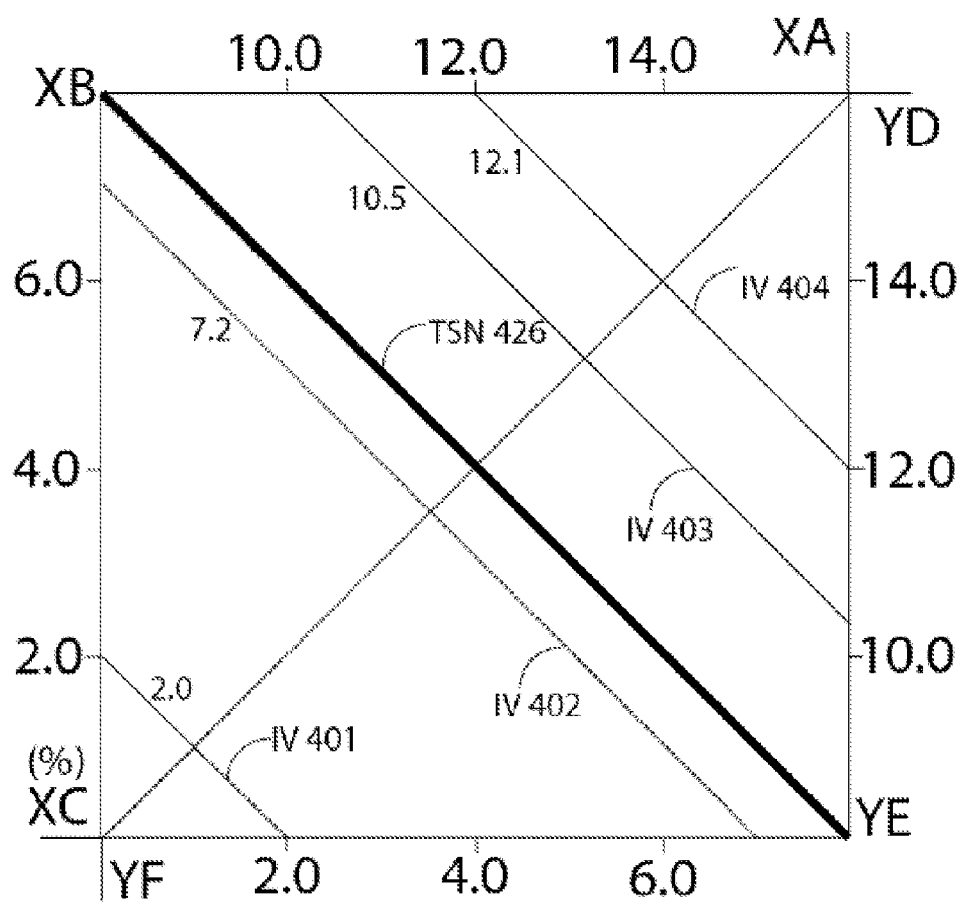
FIG. 13 illustrates another example IV model according to one or more aspects described herein.

In FIG. 13, an example of distribution of the IV for a population of stocks is presented, where the TSN is illustrated as a line between the graph points XB and YE and the norm has a value of 8.0% p.a. compounded return. Here, the one standard deviation σ is 10.5%, IV 403, and 7.2%, IV 402. The two standard deviation σ is 12.1%, IV 404, and 2.0%, IV 401.

Figure 14:
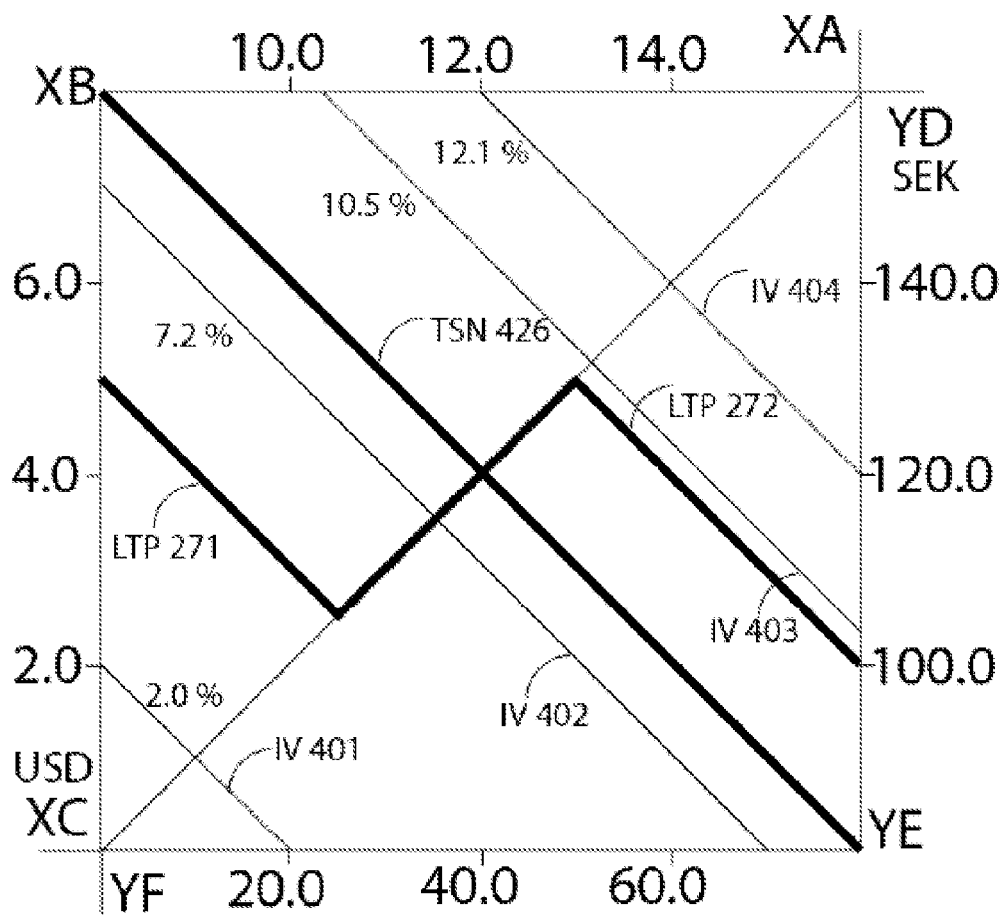
FIG. 14 is an example graph illustrating a comparison between two stocks and their long-term price trend (LTP) and Iso-Values according to one or more aspects described herein.

FIG. 14 illustrates the same population of stocks as in FIG. 13, and includes the stocks X and Y from FIG. 6. Stock X's LTP, e.g. USD 5.0 and stock Y's LTP, SEK 100, are presented.

FIG. 14 illustrates how X and Y relate to their market. Furthermore, the difference between the FIG. 14 information and the FIG. 6 information becomes clear. While the FIG. 6 information only compares X and Y's deviation from their TSV, FIG. 14 compares their deviation from the TSN.

Figure 15:
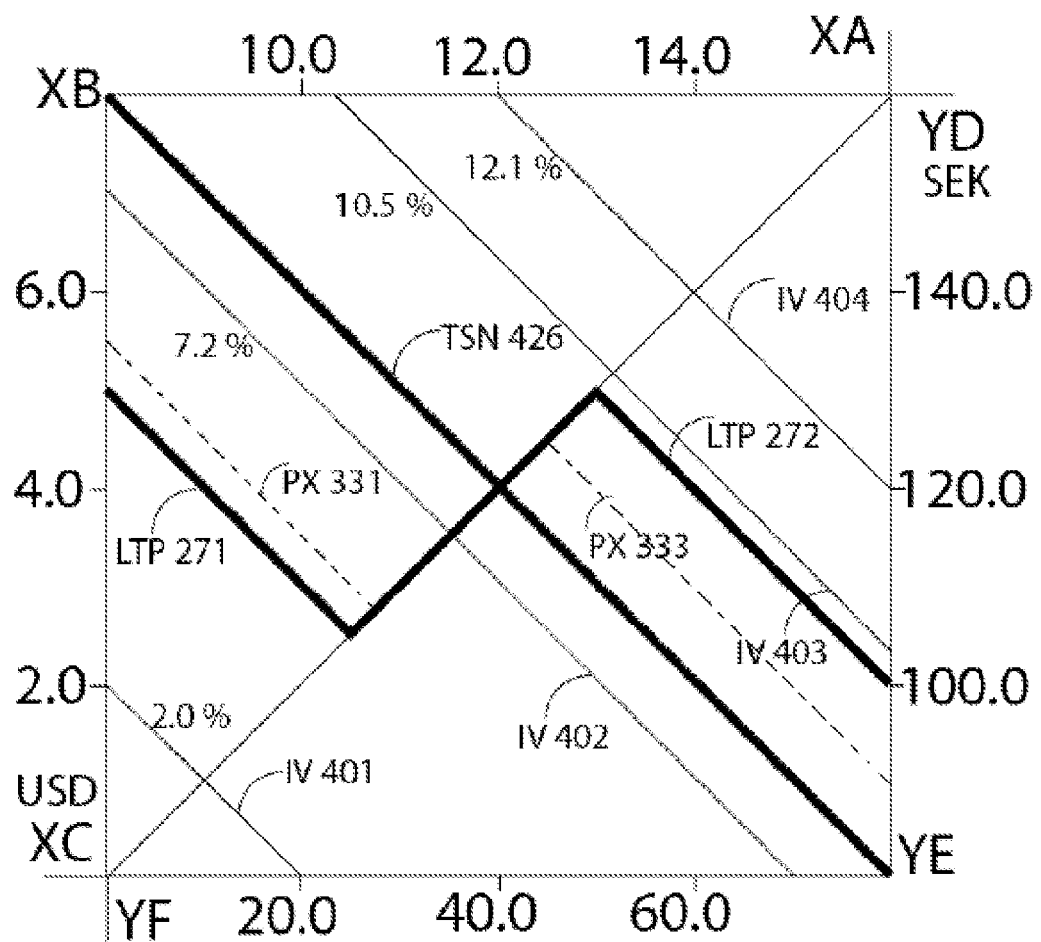
FIG. 15 is an example graph illustrating a comparison between two stocks and their long-term price trend (LTP), Iso-Values, and current closing prices, according to one or more aspects described herein.

In order to complete the comparison of X and Y, in relation to TSN, the present closing prices PX 331 and PY 333 have been added in FIG. 15.

Stock Comparator System

Aspects described herein comprise an information processing, display and delivery system configured to receive and store data in one or more databases and to process such data to generate value-added information. The system is further configured to process and distribute a range of real-time and daily data and value-added information for the practice of investment management, according to the on demand needs of a user and including the stock comparator Iso-Instrument and its key value-added variables; Total Stockholder Value (TSV), Long-Term Price Trend (LTP), Iso-Prices (IP) and Iso-Values (IV), and the Total Stockholder Value Norm (TSN) for a specific stock exchange, geographical market, market sector or globally. For example, the methods and processes described herein may be performed on-the-fly (e.g., on demand) and in real-time.

The system's outputs may, for example, be used for comparing prices and values of pairs of stocks, to make individual investment decisions and when formulating portfolio strategies and to decide upon automated business rules. The system's output is provided to users as a service on or via the Internet, through a server that is accessed using a browser and by a wired or wireless connection.

In some embodiments, the information delivery system is a separate computer program product stored on a computer-readable medium, or is integrated with or merged into other computer program products and databases. These separate computer program products can be downloaded from the Internet or is available for the user on a CD-ROM disc and is accessed directly by or indirectly from a desktop computer, a workstation, a notebook computer, or any other computing machine, including a handheld digital assistant; a cellular phone; an interactive pager; or any other mobile device.

In some embodiments, an investment management expert system based on an application module is provided, serving as a personal knowledge development and training tool of the method or information delivery system.

Figure 16:
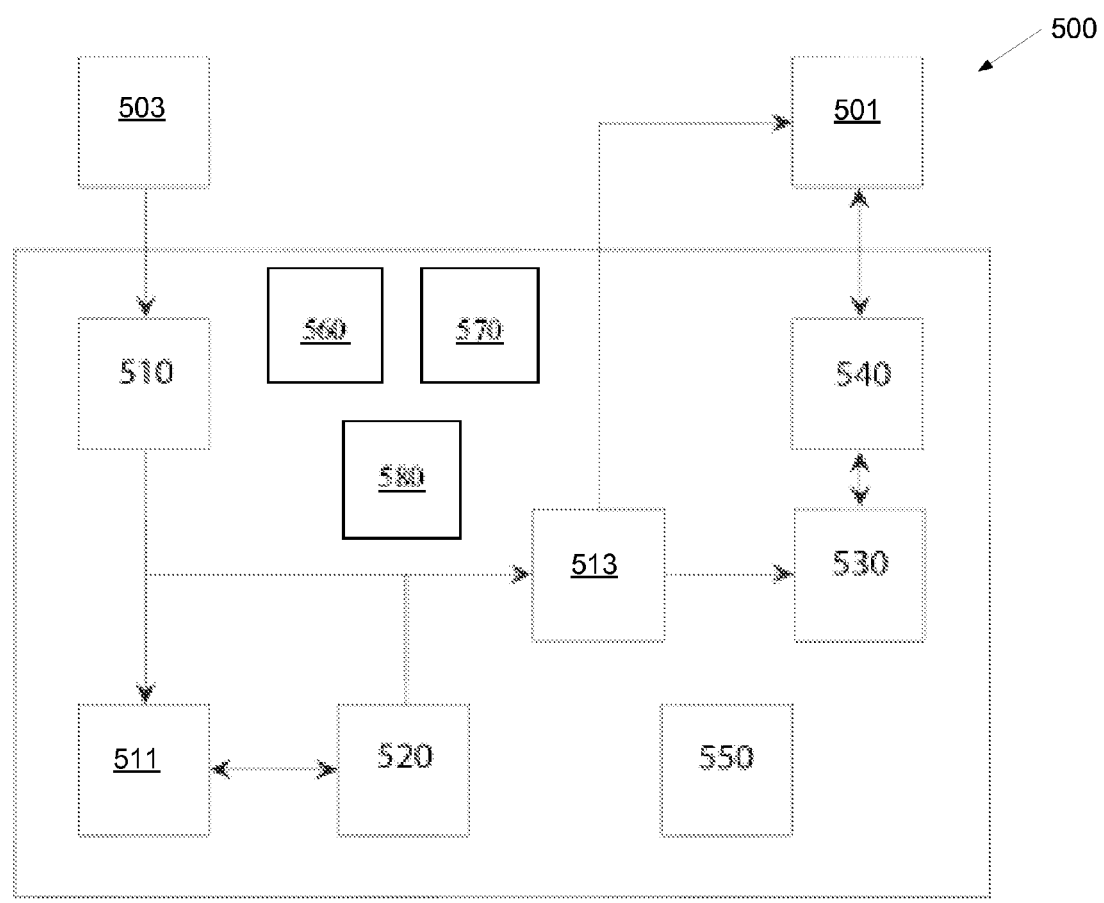
FIG. 16 is a block diagram of an example stock comparator system, according to one or more aspects described herein.

FIG. 16 illustrates a block diagram of one example of a stock value determination and comparison system. System 500 may receive and transmit data to and from a variety of sources. For example, streamed real time price data and information may be received by system 500 from vendors 503. These may include stock exchanges and information providing vendors. In another example, data output from system 500, such as IP and IV, may be provided on demand to users 501.

Received data streams and information may be, initially, controlled in a data parser program 510, before updating the main database 511. This database 511 has a structure and management system that enable Genetic Algorithms (GA) and other algorithm based application programs 520 to calculate and update value added variables for the database 511.

Within system 500, there may be a second database 513 that might only store data required to produce the graphs users request. Database 513 receives its input both from the data parser, for real time data stream and from the main database 511, sometimes including specific applications 520. Included in system 500 is also a quality control function 550.

From the graph database, information is further processed by on demand applications 530 that, in return, have been initiated by the graph request parser 540, which is the communicator with the user.

The format of output may be standardized and unified for all stock markets in a single system. The output information may be differentiated to the needs of professional users with customized needs, for example, if they want to integrate the applications with their own databases, software systems and platforms.

System 500 may further include one or more processors 560, memory including read only memory (ROM) 570 and random access memory (RAM) 580. Processor 560 may be configured to perform calculations and execute computer readable instructions stored in a database such as database 200 or from ROM 570 and RAM 580.

Figure 17:
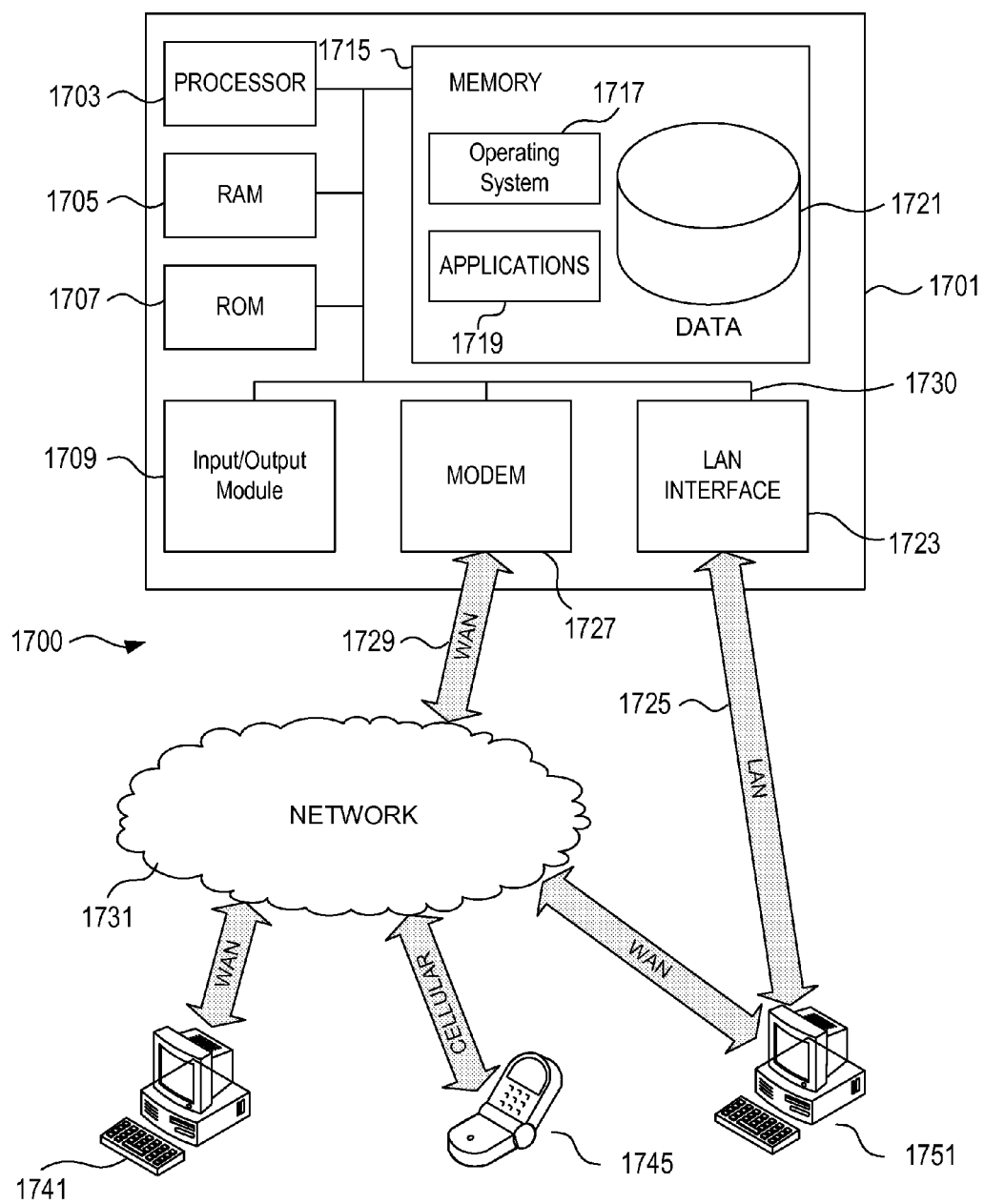
FIG. 17 is a block diagram of an example computing device and network environment that may be used with one or more aspects described herein.

FIG. 17 illustrates a block diagram of a generic computing device 1701 (e.g., a computer server) in computing environment 1700 that may be used according to an illustrative embodiment of the disclosure. For example, computing device 1701 may be used to generate stock comparator information and display the data to a user. Computing device 1701 may have a processor 1703 for controlling overall operation of the device and its associated components, including random access memory (RAM) 1705, read-only memory (ROM) 1707, input/output (I/O) module 1709, and memory 1715. Each of the components of computing device 1701 may be interconnected and communicate through a bus 1730.

I/O 1709 may include a microphone, mouse, keypad, touch screen, scanner, optical reader, and/or stylus (or other input device(s)) through which a user of device 1701 may provide input, and may also include one or more of a speaker for providing audio output and a video display device for providing textual, audiovisual and/or graphical output. Software may be stored within memory 1715 and/or other storage to provide instructions to processor 1703 for enabling device 1701 to perform various functions. For example, memory 1715 may store software used by the device 1701, such as an operating system 1717, application programs 1719, and an associated database 1721. Alternatively, some or all of device 1701 computer executable instructions may be embodied in hardware or firmware (not shown).

The device 1701 may operate in a networked environment supporting connections to one or more remote computers, such as terminals 1741, 1745 and 1751. The terminals 1741, 1745 and 1751 may be personal computers, mobile devices or servers that include many or all of the elements described above relative to the device 1701. For example, terminals 1741, 1745 and 1751 may be configured to store stock information such as current prices, trends, news and the like. The network connections depicted in FIG. 17 include a local area network (LAN) 1725 and a wide area network (WAN) 1729, but may also include other networks. When used in a LAN networking environment, device 1701 may be connected to the LAN 125 through a network interface or adapter 1723. When used in a WAN networking environment, device 1701 may include modem 1727 or other network interface for establishing communications over WAN 1729, such as network 1731. Additionally or alternatively, network 1731 may include, for example, the Internet and/or other networks such as a communication network (e.g., cell network) to which mobile communication device 1745 is connected. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 1701 and/or terminals 1741, 1745 or 1751 may also be mobile terminals (e.g., mobile phones, PDAs, notebooks, etc.) including various other components, such as a battery, speaker, and antennas (not shown).

Aspects of the present disclosure may be operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The applicability of aspects of the present disclosure has been described for financial investments representing incremental shareholdings of publicly traded stocks. A basic methodological assumption is that a stock price is dependent upon the existence and functional characteristics of its marketplace. Therefore, aspects described herein provide a contextual instrument, process and method that is adapted to the unique characteristics of different stock markets and forms of corporate governance.

Aspects described herein may be implemented in any suitable form including hardware, software, firmware or any combination of these. For example, the methods, calculations and processed described herein may be implemented as computer software running on one or more data processors and/or digital signal processors. The systems and methods described herein may further be embodied as computer readable instructions stored in one or more computer readable media such as CD-ROM, Blu-Ray Disc (BRD), hard disk, magnetic drives, optical disks and the like. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although aspects of the disclosure have been described above with reference to specific embodiments, it is not intended to be limited to the specific form set forth herein.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality.

What is claimed is:

1. A method, comprising:
   receiving, by stock-comparing computing system, a selection of a plurality of stocks for comparison;
   determining, by the stock-comparing computing system and for each stock of the plurality of stocks, at least one of an inflation-adjusted stock price for the stock or an inflation-adjusted stock dividend for the stock;
   determining by the stock-comparing computing system, for each stock of the plurality of stocks, and based on the at least one of the inflation-adjusted stock price for the stock or the inflation-adjusted stock dividend for the stock, an intrinsic value for the stock, wherein the intrinsic value corresponds to a compounded-average-growth rate of the stock between two historic periods of hold pricing for the stock, wherein an amount of time between the two historic periods of hold pricing is a set minimum length of time having a specified maximum price variation of a price of each of the plurality of stocks, wherein a first historic period of the two historic periods of hold pricing comprises a period of time prior in time to a subsequent period of time, wherein a second historic period of the two historic periods of hold pricing comprises the subsequent period of time, and wherein the first historic period corresponds to an oldest period of time recorded for the stock;
   determining by the stock-comparing computing system, for each stock of the plurality of stocks, and based on the intrinsic value for the stock, a long-term price trend for the stock; and
   providing, by the stock-comparing computing system and for each stock of the plurality of stocks, the long-term price trend for the stock as a basis for comparison of the plurality of stocks.

2. The method of claim 1, comprising generating, for each stock of the plurality of stocks, a price for the stock, said price deviating from the long-term price trend for the stock equally to deviations of prices of each other stock of the plurality of stocks from their respective long-term price trends.

3. The method of claim 1, wherein the compounded-average-growth rate of the stock includes paid dividends, and wherein determining the intrinsic value for the stock comprises utilizing the second historic period to recalculate the intrinsic value for the stock.

4. The method of claim 1, comprising determining, for each stock of the plurality of stocks, a plurality of current prices for the stock, wherein each of the plurality of current prices for the stock corresponds to a common intrinsic value, and wherein determining the plurality of current prices for the stock comprises calculating products of an expected price of the stock for the first historic period and different rates of the common intrinsic value.

5. The method of claim 2, comprising generating model output comprising indifference curves that connect prices for the plurality of stocks, wherein the model output compares the prices for the plurality of stocks with their respective long-term price trends, wherein the model output compares a price of each stock of the plurality of stocks with at least one of a real time closing price for the stock or a daily closing price for the stock, wherein the at least one of the real time closing price for the stock or the daily closing price for the stock includes a percentage and an absolute premium or discount with respect to the long-term price trend for the stock and prices of each other stock of the plurality of stocks, and wherein the model output compares, for each stock of the plurality of stocks, a momentum and an overbought or oversold indicator of the price of the stock with respect to the long-term price trend for the stock and the prices of each other stock of the plurality of stocks.

6. The method of claim 1, wherein determining the long-term price trend for the stock comprises:
utilizing the intrinsic value for the stock to determine an annual-basis-compounded intrinsic value for the stock;
determining, based on a relative number of days during the first historic period that the stock has a closing price, an inflation-adjusted median, average, or weighted expected price of the stock for the first historic period; and
multiplying the inflation-adjusted median, average, or weighted expected price of the stock by the annual-basis-compounded intrinsic value for the stock.

7. The method of claim 1, comprising determining, based on a relative number of stocks within a range of an intrinsic value for at least one of a stock exchange, geographical market, market sector, or global market, a median, average, or weighted intrinsic value for a population of stocks in the at least one of the stock exchange, geographical market, market sector, or global market.

8. The method of claim 4, comprising generating model output comprising indifference curves that connect current prices for the plurality of stocks, wherein the model output compares the current prices for the plurality of stocks with their respective intrinsic values, wherein the model output compares a current price of each stock of the plurality of stocks with at least one of a real time price for the stock or a daily closing price for the stock, wherein the model output compares the current prices for the plurality of stocks and their respective real time prices or daily closing prices with an intrinsic value norm for a stock population, and wherein the model output compares a momentum and an overbought or oversold indicator for the current prices for the plurality of stocks in relation to a price momentum and an overbought or oversold indicator for the stock population.

9. The method of claim 8, wherein generating the model output comprises generating the model output based on one or more user-specified business rules that define an investment profile and a preferred risk aversion, the one or more user-specified business rules comprising at least one of a buy-hold-sell-indicators rule or a stop-loss rule.

10. An apparatus, comprising:
at least one processor; and
memory operatively coupled to the at least one processor and storing executable instructions that, when executed by the at least one processor, cause the apparatus to:
determine, for each stock of a plurality of stocks for comparison, at least one of an inflation-adjusted stock price for the stock or an inflation-adjusted stock dividend for the stock;
determine, for each stock of the plurality of stocks and based on the at least one of the inflation-adjusted stock price for the stock or the inflation-adjusted stock dividend for the stock, an intrinsic value for the stock, wherein the intrinsic value corresponds to a compounded-average-growth rate of the stock between two historic periods of hold pricing for the stock, wherein an amount of time between the two historic periods of hold pricing is a set minimum length of time having a specified maximum price variation of a price of each of the plurality of stocks, wherein a first historic period of the two historic periods of hold pricing comprises a period of time prior in time to a subsequent period of time, wherein a second historic period of the two historic periods of hold pricing comprises the subsequent period of time, and wherein the first historic period corresponds to an oldest period of time recorded for the stock;
determine, for each stock of the plurality of stocks and based on the intrinsic value for the stock, a long-term price trend for the stock; and
provide, for each stock of the plurality of stocks, the long-term price trend for the stock as a basis for comparison of the plurality of stocks.

11. The apparatus of claim 10, wherein the apparatus comprises at least one of a handheld digital assistant, a cellular phone, or an interactive pager.

12. The apparatus of claim 10, wherein the executable instructions, when executed by the at least one processor, cause the apparatus to provide listings of comparing stock data from a database, said listings of comparing stock data comprising rankings of stocks in terms of inflation and currency-adjusted total stockholder value, present closing-price discounts, and premiums.

13. The apparatus of claim 12, wherein the listings of comparing stock data are for at least one of a stock exchange, a geographical market, a market sector, or a global market.

14. The apparatus of claim 10, wherein the apparatus is configured to receive the executable instructions via a data network.

15. The apparatus of claim 10, wherein the executable instructions, when executed by the at least one processor, cause the apparatus to generate, for each stock of the plurality of stocks, a price for the stock, said price deviating from the long-term price trend for the stock equally to deviations of prices of each other stock of the plurality of stocks from their respective long-term price trends.

16. The apparatus of claim 10, wherein the compounded-average-growth rate of the stock includes paid dividends, and wherein the executable instructions, when executed by the at least one processor, cause the apparatus to utilize the second historic period to recalculate the intrinsic value for the stock.

17. One or more non-transitory computer-readable media storing computer readable instructions that, when executed, cause an apparatus to:
determine, for each stock of a plurality of stocks for comparison, at least one of an inflation-adjusted stock price for the stock or an inflation-adjusted stock dividend for the stock;
determine, for each stock of the plurality of stocks and based on the at least one of the inflation-adjusted stock price for the stock or the inflation-adjusted stock dividend for the stock, an intrinsic value for the stock, wherein the intrinsic value corresponds to a compounded-average-growth rate of the stock between two historic periods of hold pricing for the stock, wherein an amount of time between the two historic periods of hold pricing is a set minimum length of time having a specified maximum price variation of a price of each of the plurality of stocks, wherein a first historic period of the two historic periods of hold pricing comprises a period of time prior in time to a subsequent period of time, wherein a second historic period of the two historic periods of hold pricing comprises the subsequent period of time, and wherein the first historic period corresponds to an oldest period of time recorded for the stock;

determine, for each stock of the plurality of stocks and based on the intrinsic value for the stock, a long-term price trend for the stock; and provide, for each stock of the plurality of stocks, the long-term price trend for the stock as a basis for comparison of the plurality of stocks.

18. The one or more non-transitory computer-readable media of claim 17, wherein the instructions, when executed, cause the apparatus to generate, for each stock of the plurality of stocks, a price for the stock, said price deviating from the long-term price trend for the stock equally to deviations of prices of each other stock of the plurality of stocks from their respective long-term price trends.

19. The one or more non-transitory computer-readable media of claim 18, wherein the instructions, when executed, cause the apparatus to generate model output comprising indifference curves that connect prices for the plurality of stocks, wherein the model output compares the prices for the plurality of stocks with their respective long-term price trends, wherein the model output compares a price of each stock of the plurality of stocks with at least one of a real time closing price for the stock or a daily closing price for the stock, wherein the at least one of the real time closing price for the stock or the daily closing price for the stock includes a percentage and an absolute premium or discount with respect to the long-term price trend for the stock and prices of each other stock of the plurality of stocks, and wherein the model output compares, for each stock of the plurality of stocks, a momentum and an overbought or oversold indicator of the price of the stock with respect to the long-term price trend for the stock and the prices of each other stock of the plurality of stocks.

20. The one or more non-transitory computer-readable media of claim 17, wherein the compounded-average-growth rate of the stock includes paid dividends, and wherein the instructions, when executed, cause the apparatus to utilize the second historic period to recalculate the intrinsic value for the stock.

* * * * *